(12) United States Patent
Ganong et al.

(10) Patent No.: US 8,069,321 B2
(45) Date of Patent: Nov. 29, 2011

(54) SECONDARY POOLS

(75) Inventors: Raymond E. Ganong, Oakville (CA); Timothy J. Boldt, Mississauga (CA); Nikolay K. Stoilov, Toronto (CA); Andrew Ivannikov, Toronto (CA); Mike Halim, Richmond Hill (CA)

(73) Assignee: i365 Inc., Santa Clara, CA (US)

( * ) Notice: Subject to any disclaimer, the term of this patent is extended or adjusted under 35 U.S.C. 154(b) by 550 days.

(21) Appl. No.: 11/599,077

(22) Filed: Nov. 13, 2006

(65) Prior Publication Data

US 2008/0114952 A1 May 15, 2008

(51) Int. Cl.
*G06F 12/00* (2006.01)
*G06F 13/00* (2006.01)
*G06F 13/28* (2006.01)

(52) U.S. Cl. ......................... 711/162; 711/165

(58) Field of Classification Search .......... 711/161–162, 711/165
See application file for complete search history.

(56) References Cited

U.S. PATENT DOCUMENTS

| | | | |
|---|---|---|---|
| 5,745,906 A | 4/1998 | Squibb | |
| 5,813,009 A | 9/1998 | Johnson et al. | |
| 5,990,810 A | 11/1999 | Williams | |
| 6,148,412 A | 11/2000 | Cannon et al. | |
| 6,675,177 B1 | 1/2004 | Webb | |
| 7,424,590 B2* | 9/2008 | Shinozaki et al. | 711/170 |
| 2001/0034737 A1* | 10/2001 | Cane et al. | 707/204 |
| 2001/0037323 A1 | 11/2001 | Moulton et al. | |
| 2001/0049779 A1 | 12/2001 | Shimada et al. | |
| 2002/0107877 A1 | 8/2002 | Whiting et al. | |
| 2003/0131278 A1* | 7/2003 | Fujibayashi | 714/6 |
| 2003/0225800 A1 | 12/2003 | Kavuri | |
| 2005/0086445 A1* | 4/2005 | Mizuno et al. | 711/162 |
| 2005/0216679 A1* | 9/2005 | Levy | 711/162 |
| 2006/0031637 A1* | 2/2006 | Komikado et al. | 711/114 |
| 2008/0059731 A1* | 3/2008 | Dawson et al. | 711/162 |

FOREIGN PATENT DOCUMENTS

| | | |
|---|---|---|
| EP | 0899662 | 3/1999 |
| WO | WO/0152116 | 7/2001 |
| WO | WO/2005001773 | 2/2005 |

OTHER PUBLICATIONS

Great Britain Search Report dated Feb. 18, 2008 from corresponding GB Application No. 0722255.7, 5 pages.
Spanish Office Action dated Aug. 4, 2009 from Application No. 200702996, 6 pgs.

* cited by examiner

*Primary Examiner* — Jared Rutz
*Assistant Examiner* — Ryan Bertram
(74) *Attorney, Agent, or Firm* — Weaver Austin Villeneuve & Sampson LLP

(57) ABSTRACT

Methods and apparatus for generating a secondary pool of data are disclosed. A primary pool of data is obtained or identified, where the primary pool of data includes a primary seed and one or more generations of data, wherein each of the generations of data in the primary pool of data includes one or more data blocks that have changed with reference to a safeset corresponding to a previous backup, the safeset corresponding to the previous backup including (e.g., referencing) the primary seed. A secondary pool of data is generated and at least a portion of the data in the primary pool of data is transferred to the secondary pool of data.

85 Claims, 11 Drawing Sheets

SECONDARY POOLS

BACKGROUND OF THE INVENTION

The present invention relates to the use of secondary pools for storing backup data. More particularly, the present invention relates to generating a secondary pool and transferring data to a secondary pool from another pool of data by a network device responsible for storing backup data.

In order to backup data, data backups are often performed via what is commonly referred to as a "backup application." In order to backup the data, the backup application sends the data to be stored either to a local storage medium or via a network interface for remote transmission. The amount of data that is stored by the backup application varies with the method implemented by the backup application. For instance, some backup applications backup all data in the specified directory, database or file, while other applications attempt to increase the efficiency of the backup process by storing only the data that has been modified since the last backup. One commonly used method is the fixed position delta reduction method, which determines which fixed position segments of data have been modified since the last backup and stores the data reflecting those changes. In other words, the fixed position delta reduction method determines which segments of data have been modified (e.g., added, modified, or deleted) by comparing one segment of data at a fixed position in a file or data stream received during a current backup with the segment of data previously at that same fixed position in the file or data stream during the last backup for that particular file.

FIG. 1 is a diagram illustrating an exemplary system in which a delta reduction backup application may be implemented. As shown in FIG. 1, a backup client 102 running a client component of a delta reduction backup application sends backup data 104 to a backup server 106 running a server component of a delta reduction backup application. More particularly, when a backup job that defines a set of files to be backed up is executed, a new generation of data is sent to the backup server 106. In other words, each time the same job is executed, a new generation of data is sent to the backup server 106.

The first generation of data for a backup job will typically include all data for all of the files that are being backed up by the backup job. Subsequent generations of data may each include only that data that has been modified since the previous generation of data for that backup job.

When the backup server 106 receives the backup data 104, the backup server 106 may then store the backup data 104. More particularly, the backup server 106 saves each generation of data that is sent by the backup client 102. In this manner, the backup server 106 saves only those blocks of data that have been modified since the previous backup.

A safeset is a full set of data corresponding to all files that are backed up by a backup job. There may be one safeset for each instance of a backup job. For example, if a job were scheduled to backup nightly for five days in a row, there would be five safesets stored by the backup server 106. A generation of data may be defined as a snapshot of a set of data in time. From the safesets of data that are stored by the backup server 106, it is possible to restore those safesets of data to the client at 102 via 108.

In order to store each of the safesets of data, it is possible to store each of the safesets in its entirety. However, a large amount of the data will be common to all of the safesets associated with a particular backup job. As a result, the safesets associated with a particular backup job may be stored in a pool that stores only one physical copy of the common segments of data.

Since a single backup job may be run any number of times over an extended period of time, the pool of data will eventually include data for numerous safesets. Over a long period of time, the size of the storage pool will get large, and the value of the older data for retrievals falls close to zero.

In view of the above, it would be beneficial if an improved mechanism for storing data associated with safesets could be implemented.

SUMMARY OF THE INVENTION

Methods and apparatus for storing data associated with safesets are disclosed. This is accomplished, in part, through the generation of one or more secondary storage pools. In this manner, a system including one or more primary storage pools and one or more secondary storage pools may be established.

In accordance with one aspect of the invention, a pool system corresponding to a particular backup job includes a primary pool. Each time the backup job is executed, a new generation of incremental data is generated, where each generation of incremental data includes only those data blocks that have changed with respect to the previous backup. The primary pool includes (e.g., references) a seed including one or more data blocks, where the seed represents all data blocks in all files backed up by the backup job when the backup job is executed. For instance, the seed may represent the oldest data in the primary pool or the most current data in the primary pool. In addition, the primary pool may include one or more generations of incremental data. The primary pool may include one or more seeds.

In accordance with one aspect of the invention, a secondary pool of data may be generated. More particularly, a primary pool of data may be obtained or identified, where the primary pool of data includes (e.g., references) a seed and one or more additional generations of data. Each of the additional generations of data in the primary pool of data includes one or more data blocks that have changed with reference to a safeset corresponding to another (e.g., previous or subsequent) backup, the safeset corresponding to the previous (or subsequent) backup including (e.g., referencing) a seed in the primary pool. A secondary pool of data is generated and at least a portion of the data in the primary pool of data is transferred to the secondary pool of data. The seed of the secondary pool of data may represent the most current data in the secondary pool or the oldest data in the secondary pool.

In accordance with another aspect of the invention, the pool system may include more than one secondary pool. More particularly, a first secondary pool of data is generated and at least a portion of the data in the primary pool of data is transferred to the first secondary pool of data. In addition, a second secondary pool of data is generated. At least a portion of the data in the primary pool of data or at least a portion of the data in the first secondary pool of data is transferred to the second secondary pool of data. The seed of the second secondary pool may represent either the oldest or the most current data in the second secondary pool.

In accordance with yet another aspect of the invention, a first pool of data is obtained or identified, where the first pool of data includes a first seed and one or more generations of data, wherein each of the generations of data in the first pool of data includes one or more data blocks that differ with respect to a safeset corresponding to a previous or subsequent backup, the safeset including the first seed. At least a portion of the data in the first pool of data may be transferred to a second pool of data. For instance, a difference between a seed of the first pool of data and a safeset of the second pool of data may be ascertained and transferred to the second pool of data.

In accordance with yet another aspect of the invention, when older data is transferred from one pool to another pool, a seed may be transferred. As a result, it may be desirable to generate a new seed representing the oldest data that remains in the pool of data. In accordance with one embodiment, a first seed including a plurality of data blocks is obtained. A second seed is then generated that includes a plurality of data blocks based upon the first seed and incremental data for one or more generations, wherein the incremental data includes one or more data blocks that have changed with reference to a safeset corresponding to a previous backup, the safeset corresponding to the previous backup including the first seed. The second seed may therefore serve as a seed for the secondary pool of data. The generations for which incremental data may be relevant to the generation of the second seed may depend upon the point at which data is transferred. For instance, the generations that have been transferred may be used to generate the new seed. It is possible that a secondary pool of data may include more than one seed.

In accordance with another embodiment, when older data is transferred from a primary pool to a secondary pool the seed of the primary pool is transferred and a new seed for the primary pool may be generated. More particularly, the new seed of the primary pool may be generated based upon the original primary seed and one or more of the generations of data in (or transferred from) the primary pool of data.

In accordance with yet another aspect of the invention, a pool reader is used to recreate a safeset corresponding to a particular generation of data in a pool of data (e.g., secondary pool). In accordance with one embodiment, this is accomplished by starting at the generation being recreated (e.g., restored). The pool reader than traverses the generations in a backwards manner to the first generation of data, which is the seed for the pool of data. During this process, the pool reader maintains the most current versions of all data blocks, enabling the corresponding safeset to be generated. This safeset may be provided to a client during a restore process or, alternatively, may be used as a new seed for a pool of data.

In accordance with one embodiment, an incremental pool reader can be used to generate the difference in data between safesets corresponding to two different generations of data in the pool system. More particularly, the incremental pool reader may identify those data blocks that are unique to a first safeset with regards to a second safeset (e.g., seed). For instance, an incremental pool reader may be used extract the difference between the most current safeset in the secondary pool and the oldest safeset in the primary pool, enabling the differential data to be moved from the primary pool to the secondary pool.

In accordance with another aspect of the invention, the invention pertains to a system operable to perform and/or initiate any of the disclosed methods. The system includes one or more processors and one or more memories. At least one of the memories and processors are adapted to provide at least some of the above described method operations. In yet a further embodiment, the invention pertains to a computer program product for performing the disclosed methods. The computer program product has at least one tangible computer readable medium and computer program instructions associated with at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Figure 1:
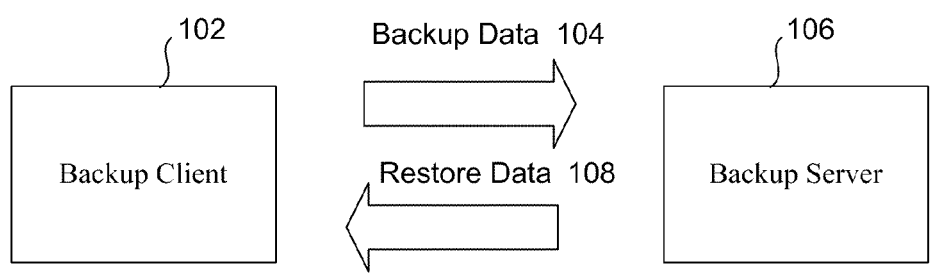
FIG. 1 is a diagram illustrating an example of a system in which a delta reduction backup application may be implemented.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable a backup data stream that is received from a network device implementing a delta reduction process to be stored by a data storage system implementing one or more pools. The network device implementing the delta reduction process providing the backup data stream may be a client, while the data storage system may be implemented by a server. However, it is important to note that the network device providing the backup data stream and the data storage system may be implemented by the same entity.

In accordance with one embodiment, the pools implemented by the data storage system include one or more primary pools and zero or more secondary pools. The primary pool may be referred to as an "active" pool in which backup data is initially stored. At least a portion of the data that is stored in the primary pool may be transferred to a secondary pool, enabling the secondary pool to be stored separately. In this manner, it is possible to archive older data to another, cheaper storage medium without data duplication.

In accordance with one embodiment, additional secondary pools may be generated dynamically as needed. The generation of a secondary pool and/or the transfer of data from a primary pool to a secondary pool may be performed upon satisfaction of a particular policy, as will be described in further detail below.

In accordance with another embodiment, each pool system may be associated with a single backup job and/or single source. In other embodiments, a pool system may be associated with two or more backup jobs and/or sources that share the same data. For instance, a different primary pool may be associated with each source. Moreover, a shared pool may represent the data that is shared among the sources. Thus, in order to merge data from two or more sources (e.g., to form a "common pool"), it may be desirable to merge two or more seeds from one or more primary pools and/or one or more shared pools of data (e.g., to form another seed).

As described above, the primary pool and each secondary pool includes data representative of one or more "safesets." In order to store the data efficiently for multiple safesets in a pool, the data that is common to (e.g., referenced by) multiple safesets is stored once in the form of a "seed." More particularly, one generation of data that includes all data for all files for the backup job forms the seed. Each subsequent safeset is represented by a corresponding generation of incremental data representing the difference between the safeset corresponding to a previous backup and the current safeset. In other words, a generation of data includes one or more files and one or more data blocks that have changed with reference to the previous backup.

In accordance with one embodiment, each data block is a fixed length data block. The length of a fixed length data block is a specific, predetermined length. The length is fixed with respect to other data blocks when each of the fixed length data blocks includes a predetermined, identical number of bytes of data. The length is fixed with respect to time when the length of a data block remains the same across time, and therefore across multiple data backups. A fixed length data block for which the length is fixed with respect to position need not be fixed with respect to time, and vice versa. Many common database programs divide databases into fixed length data blocks, where the length is fixed with respect to both position and time.

Alternatively, the disclosed embodiments may be implemented with systems storing data in the form of variable length data blocks. In such systems, the length may vary with respect to position (e.g., with respect to other data blocks) and/or time (e.g., across multiple data backups). Moreover, the disclosed embodiments may also be implemented with systems storing data in the form of fixed length data blocks where the length is fixed with respect to only position or time.

The data that is provided to or obtained by a fixed position delta reduction backup application may be obtained from a database or file. Thus, when data is transmitted or provided to a fixed position delta reduction backup application, the data may be retrieved from a database, and therefore may be retrieved from one or more files. More particularly, the data may be provided during a data backup via a "dump" in which the individual data files are provided one after the other in a contiguous fashion.

Data associated with a file or database may be received by a backup application as one or more contiguous streams of data. For instance, the backup application may call an application programming interface (API) offered by a database engine to request backup data. In response, the database API will send the backup data as a stream to the requesting application.

In order to illustrate the transfer of data from a primary pool to a secondary pool, it is helpful to illustrate the process of storing data in a primary pool of data. FIGS. 2-5 together illustrate a process of storing generations of data for a backup job in a primary pool in accordance with one embodiment of the invention.

Figure 2:
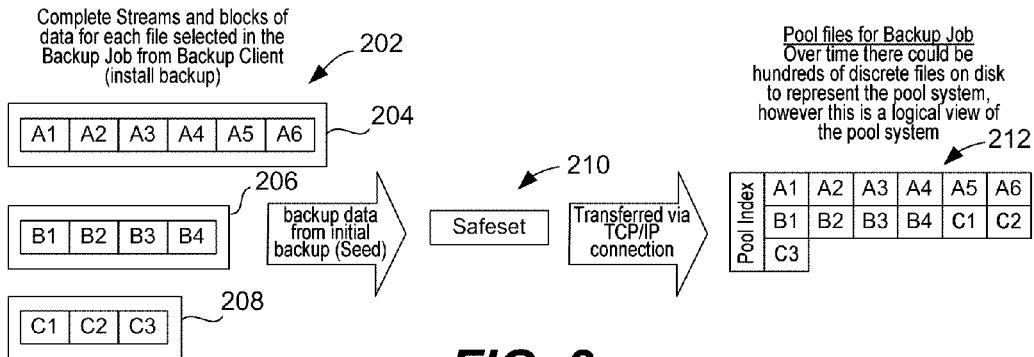
FIGS. 2-5 together illustrate a process of storing generations of data for a backup job in a primary pool in accordance with one embodiment of the invention.

FIG. 2 is a diagram illustrating the storing of the initial generation of data for a backup job as a seed in a primary pool. When a backup job is executed, each corresponding file identified in the backup job is provided as shown at 202 (e.g., by a backup client). More particularly, each file may be transmitted in one or more streams of data. In this example, the backup job identifies three files, File A, File B, and File C. File A 204 includes data blocks A1, A2, A3, A4, A5, A6. File B 206 includes data blocks B1, B2, B3, B4 206. File C 208 includes data blocks C1, C2, C3.

As a result of the initial backup executed by a backup job, the backup data represents a seed because it contains all data blocks for all files specified by the backup job. This seed may also be referred to as a safeset 210. This safeset may then be provided to a data storage system such as a separate server. Such a transfer may be performed, for example, via a network connection such as a TCP/IP connection. The data storage system (e.g., backup server) then stores this safeset as a seed in a pool as shown at 212, which will be referred to as a primary pool (e.g., "active pool").

Figure 3:
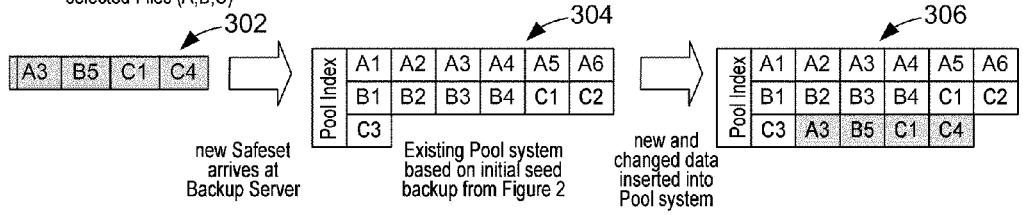

As shown in FIG. 3, when the backup job is executed a second time, a second generation of incremental data is generated. This incremental data represents the data that has changed with respect to the seed that was initially stored in the primary pool. The data that has changed may include new data, as well as data that has been modified. This may be accomplished, for example, by scanning for changed blocks in the selected files A, B, and C. In this example, the backup client has ascertained that the second generation 302 of incremental data includes blocks A3, B5, C1, and C4. As shown at 304, the primary pool includes the seed that was initially received as a result of the initial execution of the backup job. When the second generation of incremental data is received, the incremental data is added to the primary pool, as shown at 306. More particularly, the first generation of data (i.e., seed) is retained, while the second generation of data is also stored. In this example, blocks A3 and C1 have been modified, while blocks B5 and C4 represent new data.

Figure 4:
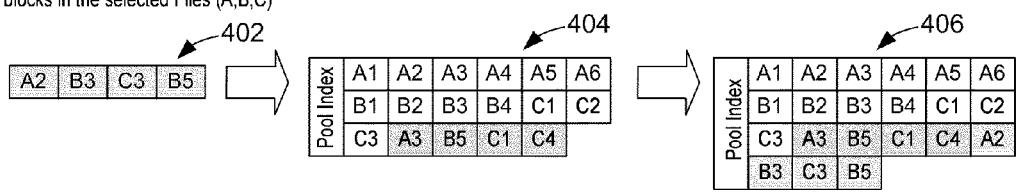

FIG. 4 represents the storing of a third generation of incremental data in the primary pool. As shown at 402, the backup client scans the selected files A, B, and C for changed blocks to generate a third generation of incremental data. More particularly, the changed blocks are those that have changed with respect to a previous backup (e.g., the previous backup). The existing primary pool now includes the seed and the second generation of incremental data, as shown at 406. Upon storing the third generation of incremental data, the primary pool includes the seed, the second generation of incremental data, and the third generation of incremental data. In this example, the third generation of incremental data includes modified blocks A2, B3, C3, and B5.

Figure 5:
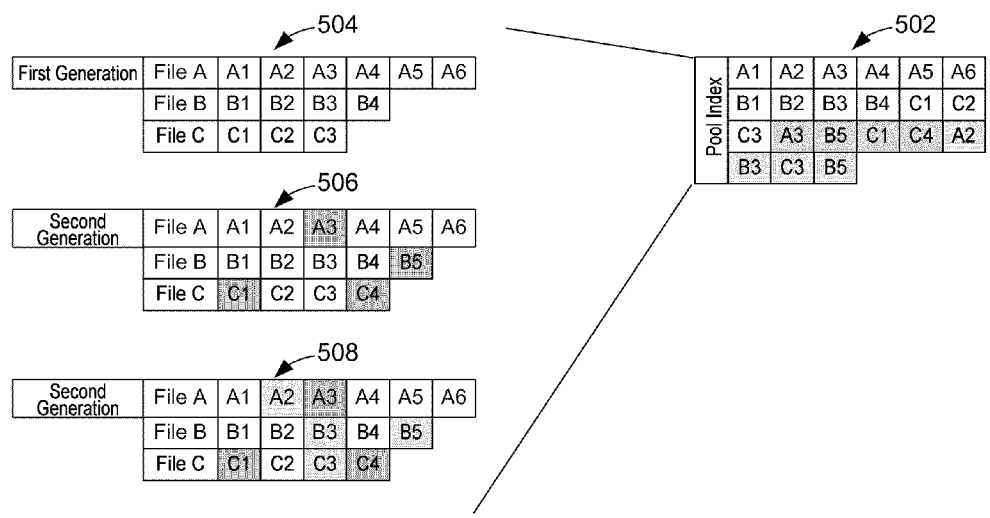

FIG. 5 is a diagram illustrating the primary pool and each corresponding safeset. More particularly, the primary pool 502 includes the initial seed representing the first generation of data, as well as the second generation of incremental data and the third generation of incremental data. In accordance with one embodiment, the primary pool 502 includes a pool index that provides visibility into the primary pool to enable a full image (i.e., safeset) of backup data to be recreated from each generation of data that includes only block level changes. More particularly, with each subsequent backup, the indices used to identify individual files may be modified to ensure that the entire image of backup data can be recreated. As shown in this example, from pool indices associated with the primary pool, a first safeset corresponding to the first generation may be retrieved, as shown at 504. Similarly, a second safeset corresponding to the second generation may be retrieved, as shown at 506. A third safeset corresponding to the third generation is shown at 508. Unfortunately, tracking the safesets by indices becomes complex as the size of the primary pool increases.

As set forth above, over an extended period of time, the size of the primary pool will get large, and the value of the older data for retrieval falls close to zero. Another aspect is that as time progresses, the commonality between safesets usually decreases. As a result, it is desirable to reduce the size of the primary pool by transferring at least a portion of the data in the primary pool to a secondary pool.

Figure 6:
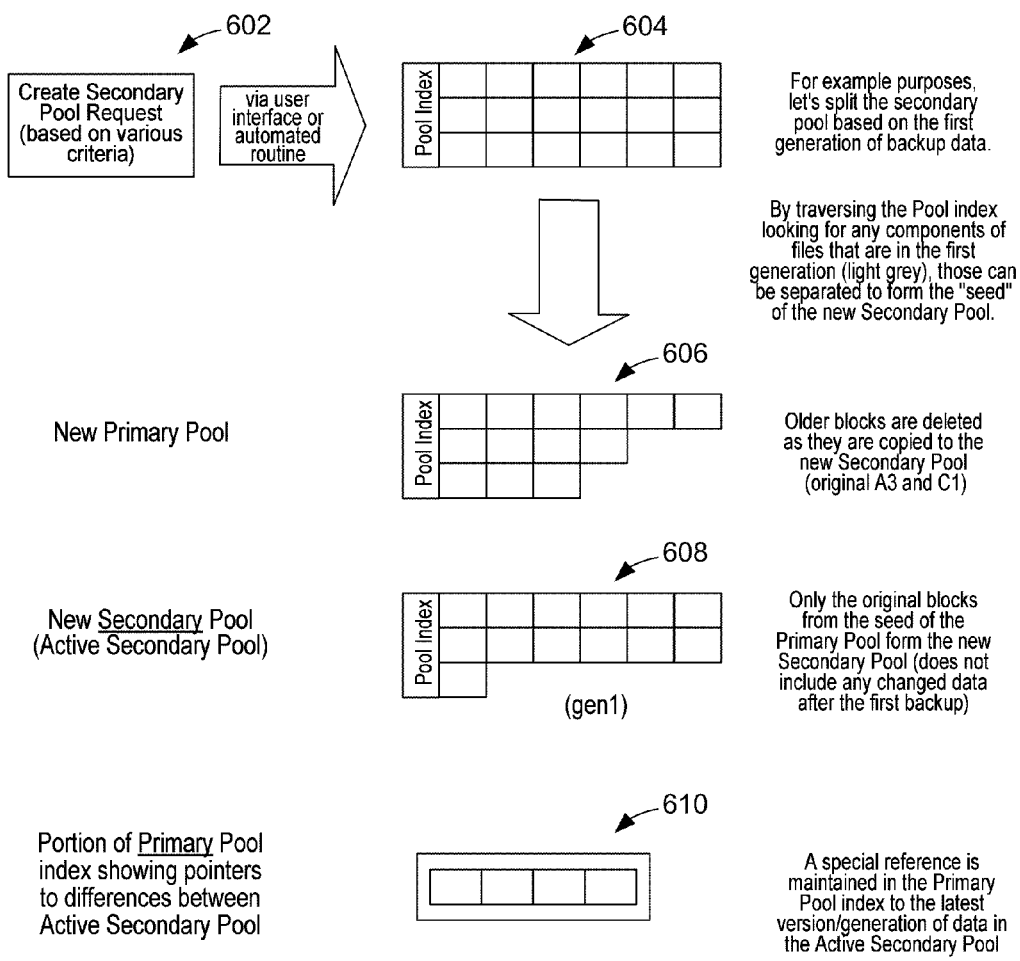
FIGS. 6-8 together illustrating a process of generating a secondary pool of data in accordance with one embodiment of the invention.
Figure 7:
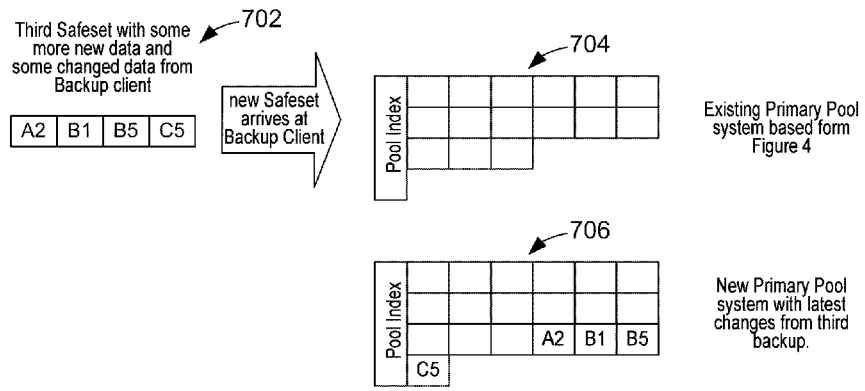
Figure 8:
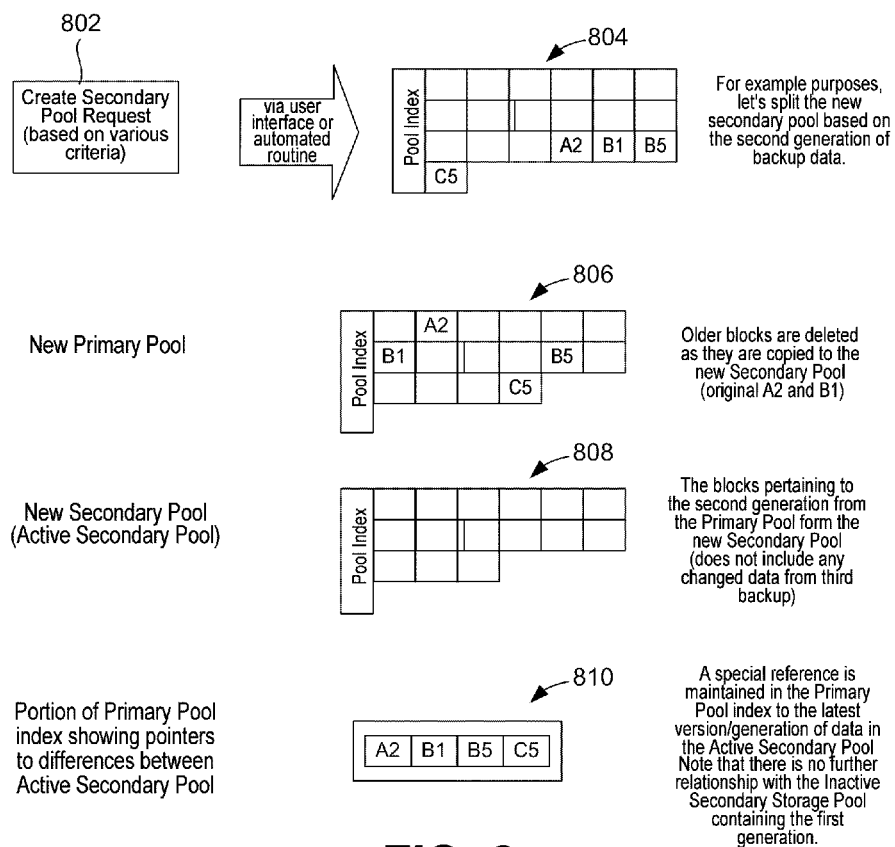

In accordance with one embodiment, one or more secondary pools may be generated. FIGS. 6-8 together illustrating a process of generating a secondary pool of data in accordance with one embodiment of the invention.

As shown in FIG. 6, a secondary pool may be generated in response to a secondary pool request 602. Such a request may be generated automatically. For instance, a secondary pool may be generated when a particular policy is satisfied. As one example, the policy may establish that a secondary pool is to be generated when a pre-determined date has been reached, a pre-determined time period has passed since the primary pool of data has been generated, and/or when a maximum number of generations of data is stored in the primary pool of data. A secondary pool request may also be generated in response to user input.

An initial primary pool is represented at 604, which includes a primary seed corresponding to the initial generation of data and a second generation of incremental data. The seed includes data blocks A1-A6, B1-B4, and C1-C2. The second generation of incremental data includes blocks A3, B5, C1, and C4.

In this example, the primary pool is split based upon the first generation of backup data. In accordance with one embodiment, by traversing the pool index of the primary pool, data blocks of files that are in the first generation can be separated to form the seed of the new secondary pool.

Since the older data corresponding to the first generation was transferred to the secondary pool, the newer data corresponding to the second generation remains in the primary pool. A new or modified primary pool results as shown at 606. As set forth above, the second generation includes modified blocks A3 and C1, and new blocks B5 and C4. As a result, the older blocks A3 and C1 are deleted as they are copied to the secondary pool. The blocks that remain in the primary pool include the safeset corresponding to the second generation, which is now the oldest generation of data in the primary pool, and the safeset corresponding to the third generation.

In accordance with one embodiment, the safeset corresponding to the second generation serves as the new seed for the primary pool. More particularly, the new seed may be generated from the previous seed and one or more generations of incremental data previously present in the primary pool. In this example, the new seed is generated using the previous seed and the second generation of incremental data. By merging the seed with the second generation of incremental data, a new seed is generated. As shown in this example, the modified blocks A3 and C1 replace the previous blocks A3 and C1, and the new blocks B5 and C4 are added to the seed. One method of generating a new seed will be described in further detail below with reference to FIG. 13.

As shown, in this example, the new secondary pool 608 includes the first generation of data from the primary pool. In other words, only the original blocks from the seed of the primary pool form the seed of the secondary pool. Although not shown in this example, it is also possible to move one or more generations of incremental data to the secondary pool. Such a transfer of one or more generations of incremental data may be performed at the same time as the initial transfer, or may be performed at a later time.

The transfer of data to a secondary pool may be performed automatically, or may be user-initiated. For instance, the transfer of data to a secondary pool may be performed when a particular policy is satisfied. As one example, the policy may establish that a particular number of generations be transferred to a secondary pool when a pre-determined date has been reached, a pre-determined time period has passed since the primary pool of data has been generated, and/or when a maximum number of generations of data is stored in the primary pool of data. The transfer of data may include the transfer of a seed and/or one or more generations of incremental data. Thus, the creation of a secondary pool implies the transfer of a seed from a primary or secondary pool.

A secondary pool may be referred to as an "active" secondary pool. An active secondary pool can receive backup data (e.g., from the primary pool). In accordance with one embodiment, the primary pool maintains an index (e.g., pointer) to the latest generation of data 610 representing the differences between the data in the primary pool and the most current generation of data in the active secondary pool.

It is also possible to generate more than one secondary pool. More particularly, multiple secondary pools may be generated simultaneously, or at separate times. Similarly, data may be transferred to different secondary pools simultaneously, or at separate times. Each secondary pool may be active or non-active (e.g., read-only). In accordance with one embodiment, an active secondary pool is maintained, while the remaining secondary pools may be non-active. Although the examples described herein refer to the transfer of data to a secondary pool from the primary pool, data may also be transferred from another secondary pool. It is also important to note that data may also be transferred among primary pools, as well as from secondary pools to primary pools.

In order to illustrate the transfer of data to another, second secondary pool, the transfer of a third generation of data to the primary pool is described with reference to FIG. 7. As shown at 702, a third generation of incremental data is received by the backup server. In this example, the third generation of incremental data includes modified blocks A2 and B1, and new blocks B5 and C5. The existing primary pool 704 is then modified to include the third generation of incremental data, as shown at 706.

In the example illustrated in FIG. 8, the primary pool 804 is "split" such that the first and second generations of data are stored in a secondary pool. After this split, the new or modified primary pool includes the most current data, which includes the third generation of data, as shown at 806. More particularly, modified blocks A2 and B1 replace the older blocks, which are deleted and copied to the new secondary pool. In addition, new blocks B5 and C5 are stored in the primary pool. While the blocks that have been moved from one pool to another are shown to be physically moved to simplify the illustration, blocks need not be physically moved. Rather, the indices may be modified to result in the "moving" of the data blocks. In this manner, a new seed of the primary pool may be generated based upon the previous seed of the primary pool and one or more of the incremental generations of data of the primary pool. Thus, the new seed in the secondary pool may be generated based upon the previous seed of the primary pool and any remaining generations of data that are transferred from the primary pool of data, which includes both the first and second generations of data in this example. The new primary seed may therefore reflect this transfer of data from the primary pool. A new seed of the primary pool may also be further generated based upon the first generation of data that has not been transferred, which is the third generation of data in this example. In other words, the new seed of the primary pool may represent the oldest data in the primary pool. In other embodiments, it is possible that a seed may represent the newest data in a pool. This new seed may be generated, for example, by recreating a safeset corresponding to the third generation of data by applying a pool reader. An exemplary pool reader will be described in further detail below with reference to FIG. 13.

The new secondary pool 808 includes data from both the first and second generations of data. In other words, the seed of the new secondary pool 808 may be the seed (e.g., first generation of data) that has been transferred from the primary pool.

In accordance with one embodiment, a primary pool index may point to the generation of data representing the differences between the primary pool and an active secondary pool, as shown at 810. Thus, a different primary pool index may point to a generation of data in each active secondary pool. Such an index or pointer may refer to the latest generation of data received, which is the third generation of incremental data, as shown at 810. The primary pool may, but need not, maintain a reference to inactive secondary storage pools.

Figure 9:
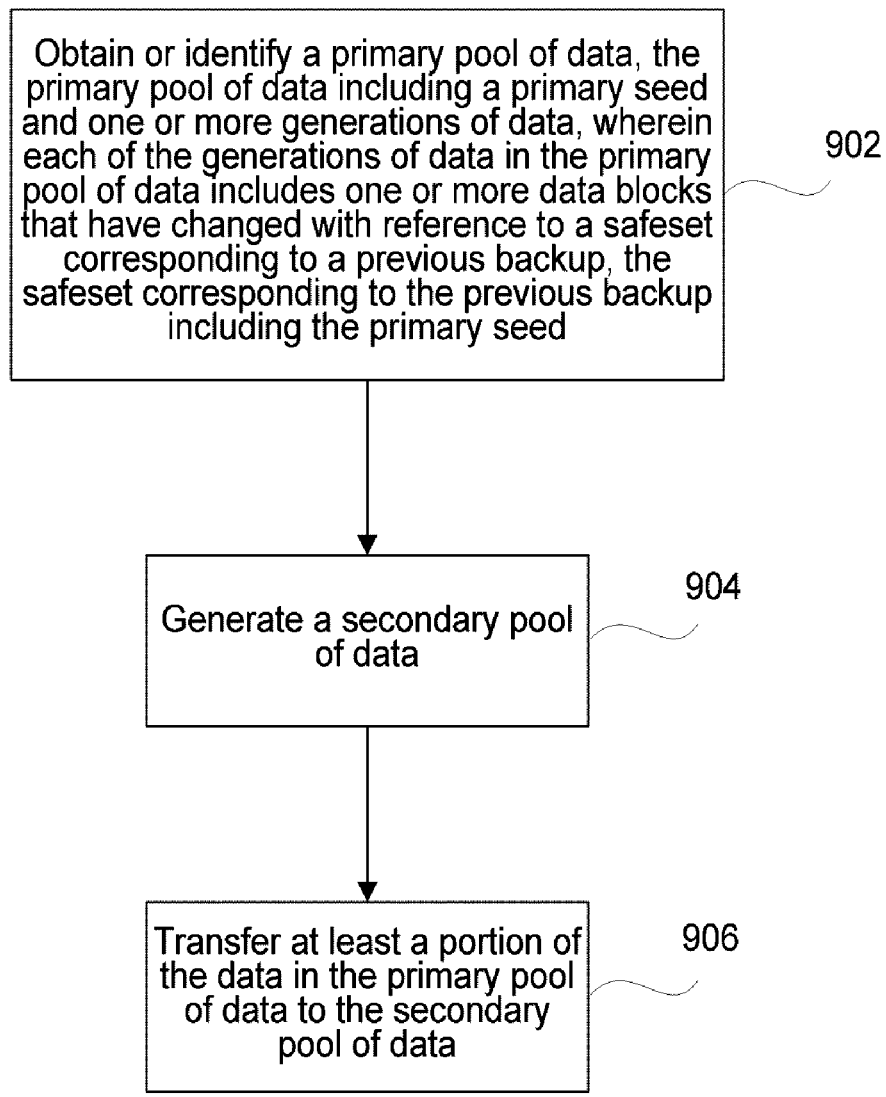
FIG. 9 is a process flow diagram illustrating a method of generating a secondary pool in accordance with one embodiment of the invention.

FIG. 9 is a process flow diagram illustrating a method of generating a secondary pool in accordance with one embodiment of the invention. As set forth above, a primary pool of data is obtained or identified at 902, where the primary pool of data includes a seed and one or more generations of data. Each of the generations of data in the primary pool of data includes one or more data blocks that have changed with reference to a safeset corresponding to a previous backup, the safeset corresponding to the previous backup including the seed of the primary pool. More particularly, each of the safesets may include or reference the seed. In addition, a safeset corresponding to a backup may include (e.g., reference) one or more of the generations of data in the primary pool.

A secondary pool of data is generated at 904. As described above, the generation of a secondary pool of data may be manually initiated, or may be generated automatically in response to a policy. At least a portion of the data in the primary pool of data may then be transferred to the secondary pool of data 906. The data that is transferred may include one or more generations of data.

Upon transfer of data to a secondary pool, the secondary pool of data may include a seed. The content of the seed of the secondary pool depends upon the data that is transferred from the primary pool. For instance, the seed may be the seed from the primary pool that has been transferred to the secondary pool. This may occur when the oldest data in the primary pool is transferred to the secondary pool. Alternatively, the seed may be generated based upon the seed of the primary pool and one or more of the generations of data. In other words, the seed may incorporate the seed of the primary pool and one or more of the generations of data of the primary pool and/or generations of data already present in the secondary pool to form a single safeset. This may be desirable, for example, when data is transferred from the "middle" of the primary pool (e.g., where data is transferred to more than one secondary pool, or all of the generations of data in the primary pool are not moved to the secondary pool).

Figure 10:
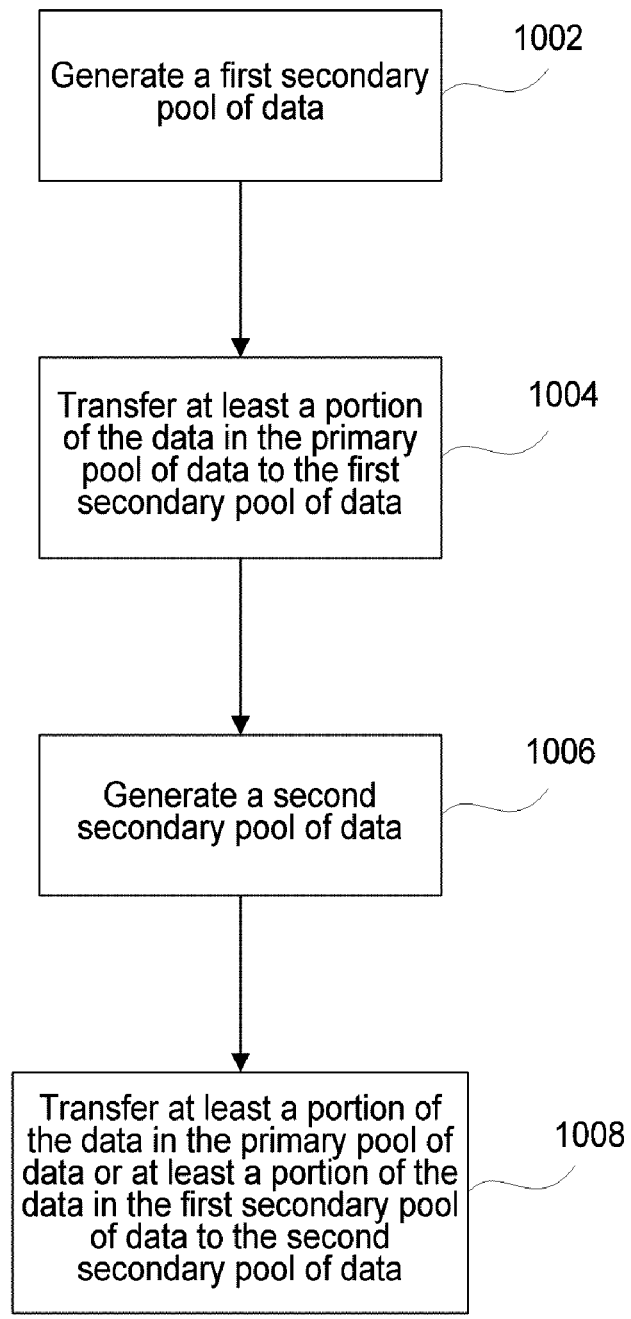
FIG. 10 is a process flow diagram illustrating a method of generating more than one secondary pool in accordance with one embodiment of the invention.

FIG. 10 is a process flow diagram illustrating a method of generating more than one secondary pool in accordance with one embodiment of the invention. A first secondary pool of data is generated at 1002. At least a portion of the data in the primary pool is transferred to the first secondary pool at 1004. Following the transfer of data, the first secondary pool may include a seed, which may be referred to as a "first seed." In addition, the first secondary pool may also include one or more generations of data, where each of the generations of data in the first secondary pool of data includes one or more data blocks that have changed with reference to a safeset corresponding to a previous backup, where the safeset corresponding to the previous backup includes the first seed.

In addition, a second secondary pool of data is generated at 1006. At least a portion of the data in the primary pool or at least a portion of the data in the first secondary pool of data is transferred to the second secondary pool at 1008. More particularly, the data that is transferred may include a seed, as well as one or more generations. Following the transfer of data, the second secondary pool may include one or more seeds. In addition, the second secondary pool may also include one or more generations of data, where each of the generations of data in the second secondary pool of data includes one or more data blocks that have changed with reference to a safeset corresponding to a previous backup, where the safeset corresponding to the previous backup includes a seed of the secondary pool.

The data that is transferred to the second secondary pool may be transferred from the primary pool. Thus, the seed in the second secondary pool may be the seed from the primary pool or may be generated based upon the seed from the primary pool and one or more generations of data in the primary pool and/or one or more generations of data already present in the second secondary pool. Where the data is transferred from the first secondary pool, the seed in the second secondary pool may be the seed from the first secondary pool or may be generated based upon the seed from the first secondary pool and one or more generations of data in the first secondary pool and/or one or more generations of data already present in the second secondary pool.

Figure 11:
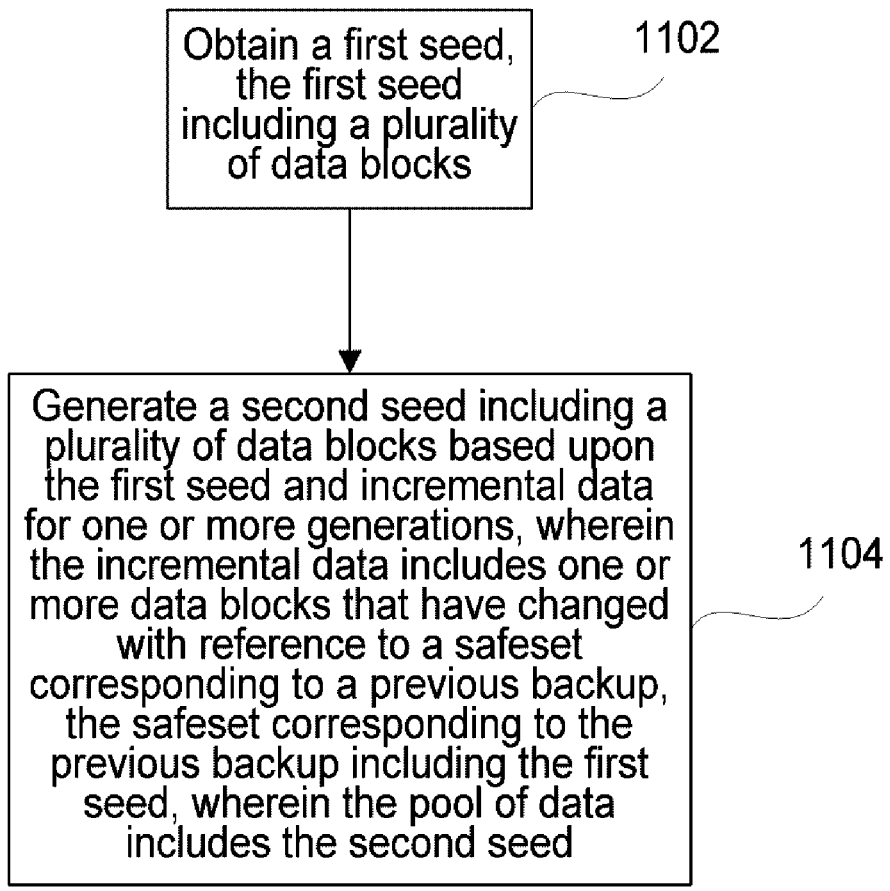
FIG. 11 is a process flow diagram illustrating a method of generating or modifying a pool of data using a newly generated seed in accordance with one embodiment of the invention.

As set forth above, the transfer of data from one pool to another pool may result in the generation of a new seed for one or both of the pools. FIG. 11 is a process flow diagram illustrating a method of generating or modifying a pool of data using a newly generated seed in accordance with one embodiment of the invention. A first seed including a plurality of data blocks is obtained at 1102. A second seed is then generated at 1104, where the second seed includes a plurality of data blocks referenced or included in the first seed and incremental data for one or more generations, wherein the incremental data includes one or more data blocks that have changed with reference to a safeset corresponding to a previous backup, the safeset corresponding to the previous backup including the first seed, wherein the pool of data includes the second seed. In this manner, the second seed may be updated to reflect recent data. For instance, the first seed may be the seed of a primary pool, while the second seed may be the new seed of the primary pool that is updated to include the most recent generation(s) of data.

As set forth above, the generation of a secondary pool and/or transfer of data to the secondary pool may be performed when a policy is met. Since these processes may include the generation of a seed, the seed may also be generated when a policy is met. For instance, a seed of the secondary pool may be generated after a pre-determined period of time has lapsed since the first seed was generated or when a pre-determined date has been reached.

Figure 12:
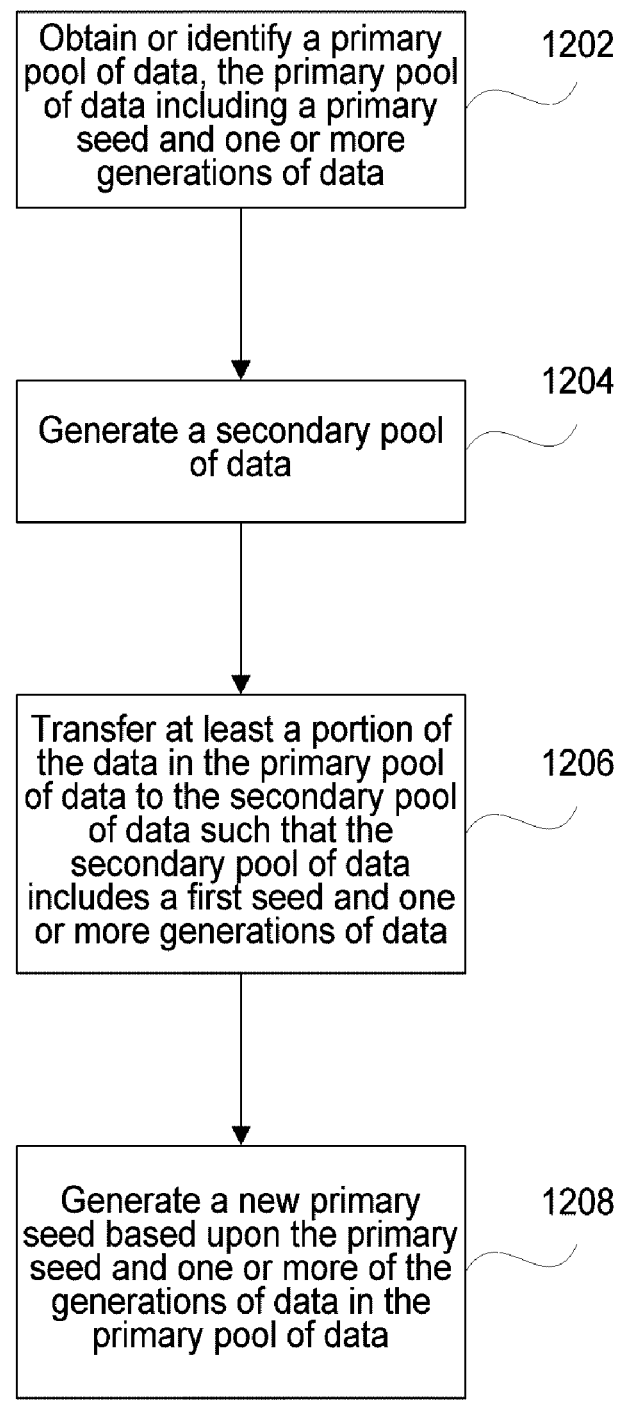
FIG. 12 is a process flow diagram illustrating a method of generating or modifying a primary pool of data upon the transfer of data to a secondary pool in accordance with one embodiment of the invention.

FIG. 12 is a process flow diagram illustrating a method of generating or modifying a primary pool of data upon the transfer of data to a secondary pool in accordance with one embodiment of the invention. A primary pool of data is obtained or identified at 1202. The primary pool of data includes a seed and one or more generations of data. Each of the generations of data in the primary pool of data includes one or more data blocks that have changed with reference to a safeset corresponding to a previous backup, the safeset corresponding to the previous backup including (e.g., referencing) the seed of the primary pool. A secondary pool of data is generated at 1204. At least a portion of the data in the primary pool of data is transferred to the secondary pool of data such that the secondary pool of data includes a seed and one or more generations of data at 1206. Each of the generations of data in the secondary pool of data includes one or more data blocks that have changed with reference to a safeset corresponding to a previous backup, the safeset corresponding to the previous backup including (e.g., referencing) the seed of the secondary pool. A data block has changed with reference to a safeset corresponding to a previous backup when the data block is new with reference to the safeset corresponding to the previous backup or when the data block has been modified with reference to the same data block in the safeset corresponding to the previous backup. A new seed of the primary pool is generated at 1208 based upon the previous seed of the primary pool and one or more of the generations of data in the primary pool of data.

Once one or more secondary pools have been generated and populated with data, one or more of the secondary pools of data may be archived to a storage medium. Moreover, a portion of a secondary pool may be archived to a storage medium. For instance, the seed and one or more generations of data in the secondary pool may be archived. In this manner, older data may be stored on a cheaper medium. Archiving may be performed in response to user input, or may be performed automatically when a policy is met. For instance, a secondary pool may be archived when the secondary pool includes a maximum number of generations of data, when a pre-determined time period has passed since the generation of the secondary pool of data, and/or when a pre-determined date has been reached.

For a variety of reasons, it may be desirable for the backup server to retrieve and restore data. In accordance with one embodiment, a user may select a generation or set of generations in a secondary pool to be restored. For instance, the selection may identify a set of generations according to date stored and/or other criteria. The data that is restored for a particular generation will include an entire "safeset" of data.

In accordance with one embodiment, in order to restore a particular generation of data in a secondary pool, the selected generation and any generations of data in the secondary pool that have been received prior to the generation of data being restored (including the seed), are used. An exemplary process of restoring a generation of data will be described in further detail below with reference to FIG. 13.

In accordance with one embodiment, an pool reader may be used to restore data associated with a particular generation/safeset. The pool reader uses the fact that each generation of data includes only changed (e.g., new or modified) data. Therefore, when the pool reader is used to recreate a particular safeset associated with a generation of data, it starts at the safeset being recreated and works backwards (e.g., to the first safeset in the pool). If a data block is referenced by more than one safeset, the most recent data block will be used. In accordance with one embodiment, when a data block has already been found in a safeset, the pool reader will stop scanning previous safesets for that data block. In other words, there is no need to locate prior versions of the data block since only the most recent version of the data block is desired.

In the following description, it is assumed that the incremental generation of data corresponding to a safeset identifies one or more files. Each of the files includes one or more data blocks, which may be grouped as streams of data. The reader will therefore traverse the most recent generation of data corresponding to the most recent safeset in the pool, and scan/traverse the remaining previous generations/safesets in the pool, as necessary. During this process, the most current version of each unique data block is maintained in a data structure or file, which may be referred to as an "incremental difference" or "restored safeset."

An incremental pool reader may be used to generate a subset of data that represents the difference between two different safesets of data. Thus, when data is to be transferred from one pool to another pool (e.g., from the primary pool to the secondary pool), it is possible to compare the data already present in the secondary pool with the data to be transferred. For instance, it is possible to compare the latest safeset of data in the secondary pool with the seed of the primary pool that is to be transferred to the secondary pool. Through using the incremental pool reader, it is possible to identify the differential data and transfer only that differential data to the secondary pool.

Figure 13:
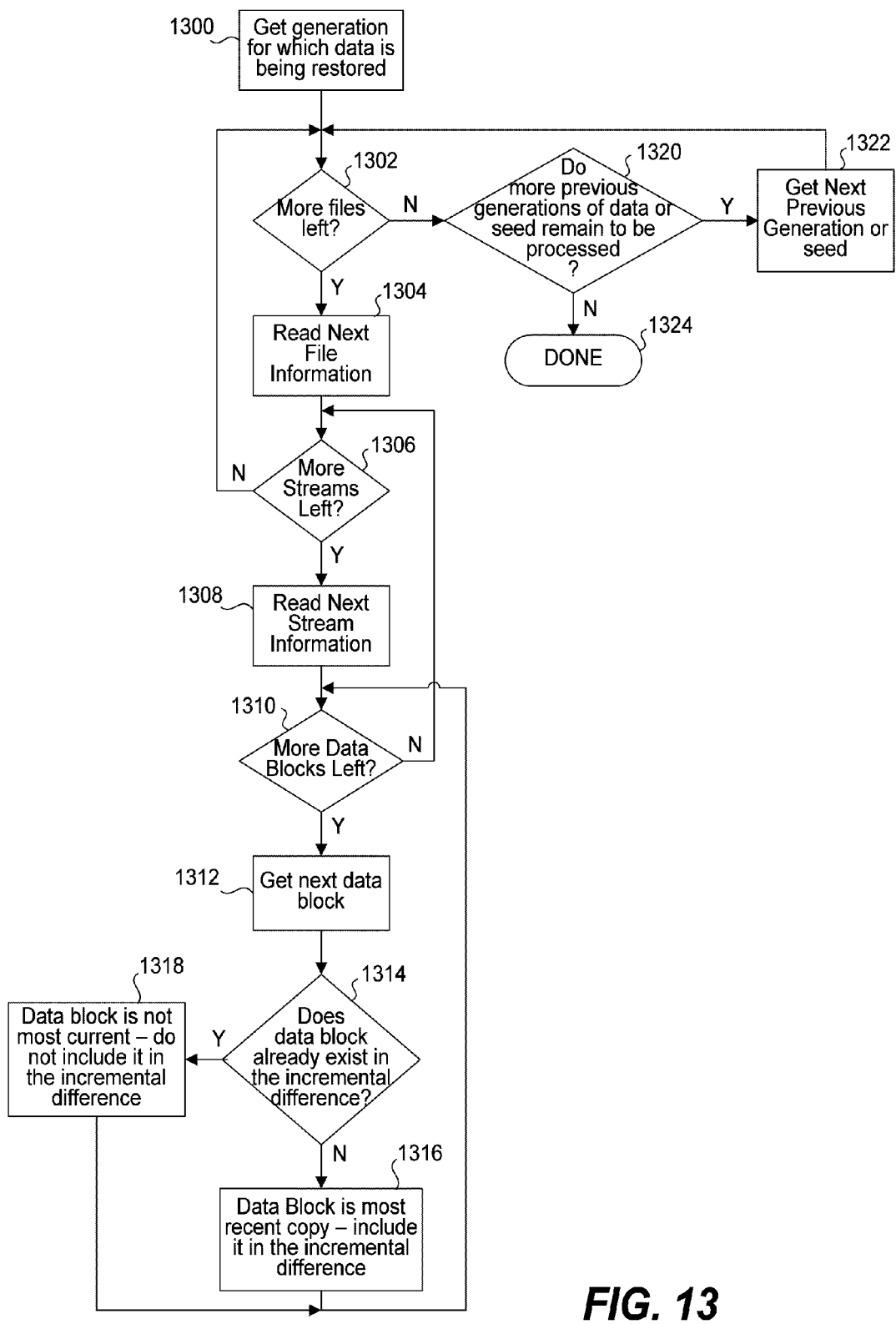
FIG. 13 is a process flow diagram illustrating a method of implementing an incremental pool reader in accordance with one embodiment of the invention.

FIG. 13 is a process flow diagram illustrating a method of implementing a pool reader in accordance with one embodiment of the invention. The following process assumes that the incremental difference (i.e., restored safeset) is initialized to the null set. The process begins at 1300 at the generation for which data is being restored and determines whether the generation includes more files to be processed at 1302. If more files remain to be processed, the next file information may be read at 1304. For instance, the file information may identify one or more streams of data blocks present in the file. If no more streams in the file remain to be processed at 1306, the process continues at 1302 for any remaining files in the generation. If more streams in the file remain to be processed at 1306, the next stream information may be read at 1308. For instance, the stream information may identify one or more data blocks in the stream. If no more data blocks remain in the data stream at 1310, the process continues for any remaining data streams in the file at 1306. If more data blocks remain in the data stream at 1310, the next data block in the data stream is obtained at 1312. It may then be determined whether the obtained data block already exists in the incremental difference (e.g., restored safeset) at 1314. If the data block does not already exist in the incremental difference, the data block is the most recent copy (i.e., version) of the data block, and it is included in the incremental difference. However, if a version of the data block does already exist in the incremental difference, the data block is not the most current version, and it is not included in the incremental difference at 1318. The process continues at 1310 for any remaining data blocks in the data stream.

If no more files remain to be processed for the generation at 1302, it is determined whether more previous generations of data (e.g., including the seed) remain to be processed at 1320.

If more generations (including the seed) remain to be processed, the next previous generation is obtained at 1322, and the process continues to process the files in the generation at 1302, as set forth above. If no more generations remain to be processed at 1320, the process ends at 1324.

Once the incremental pool reader has finished processing the pool of data, the incremental data (e.g., restored safeset) may be provided to the client, or used as a new seed for an existing pool of data. In this manner, a complete safeset may be generated from incremental generations of data and the corresponding seed.

The primary and secondary pools associated with a particular backup job may be maintained using a variety of files and/or data structures. For instance, a linked list, indices, and/or pointers may be used to link the various pools and/or generations.

In accordance with one embodiment, a pool file location list identifies all pool files for a particular backup job. More particularly, the pool files together make up a pool for a given backup job. In addition a safeset pool index file contains a list of all versions of the files that have been backed up and the location of all of the pieces of each version of each file within the pool.

Generally, the techniques of the present invention may be implemented on software and/or hardware. In a specific embodiment of this invention, the technique of the present invention is implemented in software. Thus, the present invention relates to machine-readable media that include program instructions, state information (e.g., tables), etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in or associated with a tangible computer-readable medium in which a carrier wave travels over an appropriate medium such as airwaves, optical lines, electric lines, etc. Examples of program instructions include both machine code, such as produced by a compiler, and files containing higher level code that may be executed by a computer using an interpreter.

Figure 14:
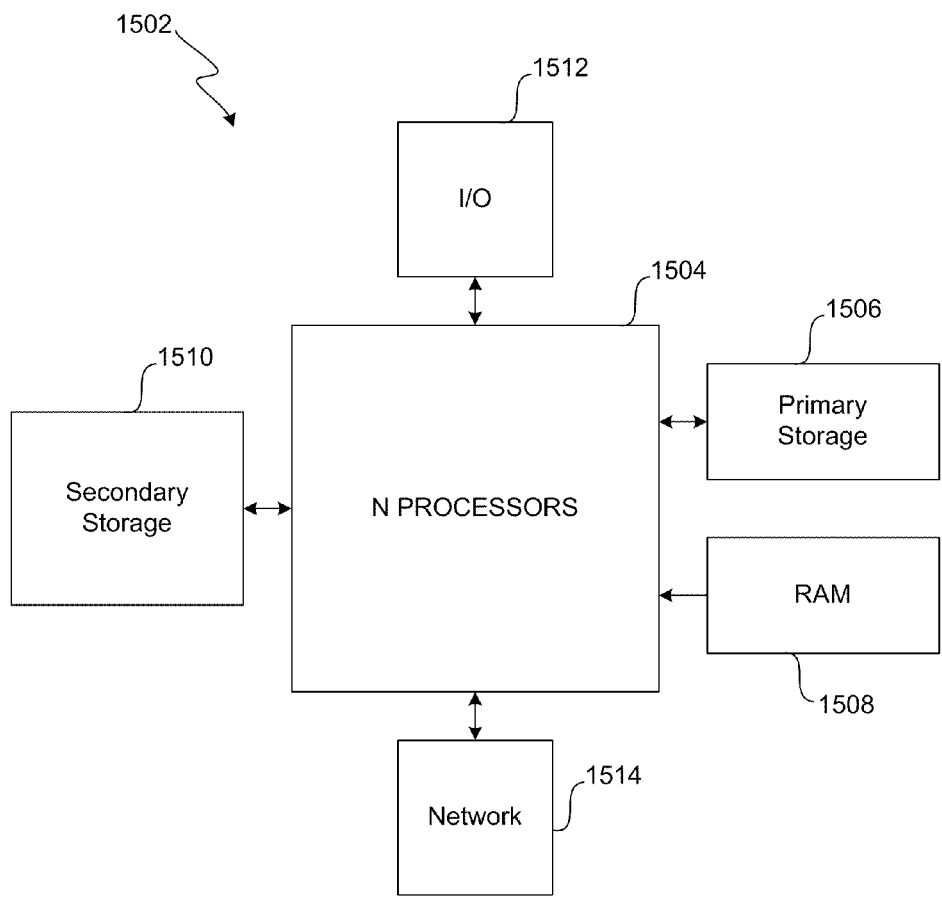
FIG. 14 is a block diagram illustrating a typical, general-purpose computer system suitable for implementing the present invention.

The present invention may be implemented on any suitable computer system. FIG. 14 illustrates a typical, general-purpose computer system 1502 suitable for implementing the present invention. The computer system may take any suitable form.

The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk, which is generally slower than primary storage devices 1506, 1508. Alternatively, the mass memory device 1510 may be a storage device such as a SCSI storage device. In accordance with one embodiment, the primary and secondary pools may be stored on the secondary storage medium 1510.

The CPUs 1504 optionally may be coupled to a computer or telecommunications network, e.g., an internet network or an intranet network, using a network connection as shown generally at 1514. With such a network connection, it is contemplated that the CPUs 1504 might receive information from the network (e.g., data associated with a restore process), or might output information to the network (e.g., data that has been processed by a fixed position delta reduction backup process or data that has been modified prior to being processed by a fixed position delta reduction backup application) in the course of performing the above-described method steps. Thus, backup data may be transmitted over a network to be processed, or to be stored to or retrieved from a remote storage device. For instance, the network may be a storage area network (SAN) such as a fibre-channel SAN. Accordingly, the invention may be installed for use across a network such as the Internet, thereby enabling data retrieval from and backup to disparate sources.

Although the foregoing invention has been described in some detail for purposes of clarity of understanding, it will be apparent that certain changes and modifications may be practiced within the scope of the appended claims. For instance, although the description refers to the transfer of data from a primary pool to a secondary pool, data may also be transferred between and among secondary pools or primary pools, or from a secondary pool to a primary pool. Moreover, each pool may include one or more seeds and/or one or more generations of incremental data. In addition, although the description refers to the transferring of data, it is important to note that the transfer of data may be a virtual transfer (e.g., via modification of indices) rather than a physical transfer of data. Therefore, the described embodiments should be taken as illustrative and not restrictive, and the invention should not be limited to the details given herein but should be defined by the following claims and their full scope of equivalents.

What is claimed is:

1. A method of generating a pool of data, comprising:
   automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed; and
   automatically generating a secondary pool of data;
   automatically transferring at least a portion of the data in the primary pool of data to the secondary pool of data such that the primary pool of data no longer includes the at least a portion of the data that has been transferred to the secondary pool of data, wherein the secondary pool of data includes a first seed and one or more generations of data;
   archiving the secondary pool of data to a storage medium; and
   restoring data for one of the generations of data in the secondary pool using the first seed, the generation of data, and generations of data in the secondary pool that have been received prior to the generation of data being restored.

2. The method as recited in claim 1, further comprising:
   automatically transferring at least a portion of the data in the secondary pool of data to the primary pool of data such that the secondary pool of data no longer includes the at least a portion of the data that has been transferred to the primary pool of data.

3. The method as recited in claim 1, further comprising:
automatically generating a new primary seed based upon the primary seed and one or more of the generations of data in the primary pool of data.

4. The method as recited in claim 1, wherein the safeset corresponding to a previous backup further includes one or more of the generations of data.

5. The method as recited in claim 1, wherein the primary pool represents current backup data and the secondary pool represents archived data, wherein the current backup data is different from the archived data.

6. The method as recited in claim 1, wherein each generation of data includes one or more data blocks obtained as a result of a corresponding backup resulting from execution of a backup job.

7. The method as recited in claim 1, wherein at least one of generating or moving is performed automatically when a policy is met.

8. The method as recited in claim 7, wherein the policy is met when at least one of a pre-determined date has been reached, a pre-determined time period has passed since the primary pool of data has been generated, or when a maximum number of generations of data is stored in the primary pool of data.

9. The method as recited in claim 1, wherein transferring is performed such that the secondary pool of data includes a first seed, wherein the primary pool of data includes a first set of generations of data and the secondary pool of data includes a second set of generations of data, wherein the first set of generations of data is different from the second set of generations of data.

10. The method as recited in claim 9, wherein the first seed is the primary seed.

11. The method as recited in claim 9, wherein the first seed is generated automatically based upon the primary seed and one or more of the generations of data from at least one of the primary pool or the secondary pool, wherein the primary pool does not include the first seed.

12. The method as recited in claim 9, wherein the secondary pool of data further includes one or more generations of data that are not stored in the primary pool, wherein each of the generations of data in the secondary pool of data includes one or more data blocks that have changed with reference to a safeset corresponding to a previous backup, the safeset corresponding to the previous backup including the first seed.

13. The method as recited in claim 12, wherein the safeset corresponding to the previous backup further includes one or more of the generations of data in the secondary pool of data.

14. The method as recited in claim 12, wherein the generations of data in the secondary pool of data are obtained from the primary pool of data, wherein transferring comprises:
automatically moving a set of generations of data from the primary pool of data to the secondary pool of data such that the primary pool of data no longer includes the set of generations of data that have been moved to the secondary pool of data.

15. The method as recited in claim 14, wherein moving a set of generations of data is performed automatically when a policy is met.

16. The method as recited in claim 1, wherein archiving is performed automatically when a policy is met.

17. The method as recited in claim 1, further comprising:
receiving a selection of the one of the generations of data in the secondary pool to be restored.

18. The method as recited in claim 1, wherein the secondary pool includes read-only data.

19. The method as recited in claim 1, further comprising:
obtaining the primary seed, the primary seed including a plurality of data blocks; and
generating a first seed including a plurality of data blocks based upon the primary seed and the at least a portion of the data in the primary pool that is transferred to the secondary pool, wherein the at least a portion of the data includes one or more data blocks that have changed with reference to a safeset corresponding to a previous backup, the safeset corresponding to the previous backup including the primary seed;
wherein the secondary pool of data includes the first seed.

20. The method as recited in claim 9, wherein transferring is performed when a policy is met.

21. The method as recited in claim 9, further comprising:
generating a new seed such that the first seed is updated after a pre-determined period of time has lapsed since the first seed was generated or when a pre-determined date has been reached.

22. A method of generating two or more secondary pools of data based upon a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed, the method comprising:
automatically generating a first secondary pool of data;
automatically transferring at least a portion of the data in the primary pool of data to the first secondary pool of data;
automatically generating a second secondary pool of data;
automatically transferring at least a portion of the data in the primary pool of data or at least a portion of the data in the first secondary pool of data to the second secondary pool of data such that the at least a portion of the data that has been transferred is no longer stored in the primary pool of data or the first secondary pool of data from which the at least a portion of the data has been transferred;
automatically archiving the first secondary pool of data, wherein the first secondary pool of data includes a first seed and one or more generations of data and wherein archiving the first secondary pool of data includes automatically storing the seed and at least one of the generations of data to a storage medium; and
restoring data for one of the generations of data in the first secondary pool using the first seed, the generation of data, and generations of data in the first secondary pool that have been received prior to the generation of data being restored.

23. The method as recited in claim 22, further comprising:
automatically generating a new primary seed based upon the primary seed and one or more of the generations of data in the primary pool of data.

24. The method as recited in claim 22, wherein the safeset corresponding to the previous backup further includes one or more of the generations of data.

25. The method as recited in claim 22, wherein the primary pool represents current backup data and each of the secondary pools represents archived data that is older than the current backup data, wherein the current backup data and the archived data are different.

26. The method as recited in claim 22, wherein each generation of data includes one or more data blocks obtained as a result of a corresponding backup.

27. The method as recited in claim 22, wherein the transferring steps are performed such that the first secondary pool of data includes a first seed and the second secondary pool includes a second seed, wherein the first seed is different from the second seed.

28. The method as recited in claim 27, wherein transferring at least a portion of the data in the primary pool of data to the first secondary pool of data is performed such that the first secondary pool of data further includes one or more generations of data, wherein each of the generations of data in the first secondary pool of data includes one or more data blocks that have changed with reference a safeset corresponding to a previous backup, the safeset corresponding to the previous backup including the first seed.

29. The method as recited in claim 27, wherein transferring at least a portion of the data in the primary pool of data or at least a portion of the data in the first secondary pool of data to the second secondary pool of data is performed such that the second secondary pool of data further includes one or more generations of data, wherein each of the generations of data in the second secondary pool of data includes one or more data blocks that have changed with reference to a safeset corresponding to a previous backup, the safeset corresponding to the previous backup including the second seed.

30. The method as recited in claim 27, wherein the first seed is the primary seed or wherein the first seed is generated based upon the primary seed and one or more generations of data including one or more data blocks that have changed with reference to a safeset corresponding to a previous backup, the safeset corresponding to the previous backup including the primary seed.

31. The method as recited in claim 27, wherein the second seed is the primary seed, the first seed, wherein the second seed is generated based upon the primary seed and at least one of one or more of the generations of data in the primary pool or one or more generations of data already present in the second secondary pool, or wherein the second seed is generated based upon the first seed and at least one of one or more generations of data in the first secondary pool or one or more generations of data already present in the second secondary pool.

32. The method as recited in claim 22, wherein at least one of the first secondary pool or the second secondary pool includes read-only data.

33. The method as recited in claim 22, wherein archiving is performed automatically when a policy is met.

34. The method as recited in claim 33, wherein the policy is met when at least one of the first secondary pool of data includes a maximum number of generations of data, when a pre-determined time period has passed since the generation of the first secondary pool of data, or when a pre-determined date has been reached.

35. The method as recited in claim 22, further comprising:
receiving a selection of the one of the generations of data in the first secondary pool to be restored.

36. The method as recited in claim 22, wherein transferring at least a portion of the data in the primary pool of data or at least a portion of the data in the first secondary pool of data to the second secondary pool of data is performed such that the second secondary pool of data includes a second seed and one or more generations of data, wherein each of the generations of data in the second secondary pool of data includes one or more data blocks that have changed with reference to backup data corresponding to a previous backup, the safeset corresponding to the previous backup including the second seed.

37. The method as recited in claim 36, wherein the second seed is generated based upon the primary seed and one or more of the generations of data in the primary pool of data such that the second seed is different from the primary seed.

38. The method as recited in claim 36, wherein the generations of data in the second secondary pool of data are obtained from the primary pool of data, the method further comprising:
automatically moving a set of generations of data from the primary pool of data to the second secondary pool of data such that the primary pool of data no longer includes the set of generations of data that have been moved to the secondary pool of data.

39. The method as recited in claim 38, wherein moving a set of generations of data is performed automatically when a policy is met.

40. The method as recited in claim 36, wherein the second secondary pool is automatically generated when a policy is met.

41. The method as recited in claim 36, further comprising:
automatically archiving the second secondary pool of data.

42. The method as recited in claim 41, wherein archiving is performed when a policy is met.

43. The method as recited in claim 41, wherein the second secondary pool of data includes a second seed and one or more generations of data and wherein archiving the second secondary pool of data comprises:
storing the second seed and at least one of the generations of data in the second secondary pool of data to a storage medium.

44. The method as recited in claim 43, further comprising:
restoring data for one of the generations of data in the second secondary pool using the second seed, the generation of data, and generations of data in the second secondary pool that have been received prior to the generation of data being restored.

45. The method as recited in claim 44, further comprising:
receiving a selection of the one of the generations of data in the second secondary pool to be restored.

46. A method of generating two or more secondary pools of data based upon a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed, the method comprising:
automatically generating a first secondary pool of data;
automatically transferring at least a portion of the data in the primary pool of data to the first secondary pool of data;
automatically generating a second secondary pool of data;
automatically transferring at least a portion of the data in the primary pool of data or at least a portion of the data in the first secondary pool of data to the second secondary pool of data such that the at least a portion of the data that has been transferred is no longer stored in the primary pool of data or the first secondary pool of data from which the at least a portion of the data has been transferred;
wherein transferring at least a portion of the data in the primary pool of data or at least a portion of the data in the first secondary pool of data to the second secondary pool of data is performed such that the second secondary pool of data includes a second seed and one or more generations of data, wherein each of the generations of data in the second secondary pool of data includes one or more data blocks that have changed with reference to a safeset corresponding to a previous backup, the safeset corresponding to the previous backup including the second seed;

archiving the second secondary pool of data, wherein archiving the second secondary pool of data includes automatically storing the second seed and at least one of the generations of data in the second secondary pool to a storage medium; and restoring data for one of the generations of data in the second secondary pool based upon the second seed, the generation of data, and generations of data in the second secondary pool that have been received prior to the generation of data being restored.

47. The method as recited in claim 46, wherein the second seed is automatically generated based upon the first seed and one or more of the generations of data in the first secondary pool of data such that the second seed is different from the first seed.

48. The method as recited in claim 46, wherein the generations of data in the second secondary pool of data are obtained from the first secondary pool of data, the method further comprising:
automatically moving a set of generations of data from the first secondary pool of data to the second secondary pool of data such that the first secondary pool of data no longer includes the set of generations of data that have been moved, wherein moving a set of generations of data is performed when a policy is met.

49. The method as recited in claim 46, wherein the second secondary pool is automatically generated when a policy is met.

50. The method as recited in claim 46, wherein archiving is performed automatically when a policy is met.

51. The method as recited in claim 46, further comprising:
receiving a selection of the one of the generations of data in the second secondary pool to be restored.

52. A method of generating a pool of data, comprising:
automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;
automatically generating a first secondary pool of data;
automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;
wherein after the at least a portion of the data has been transferred, the primary pool of data no longer includes the first seed and the one or more generations of data;
automatically generating a new primary seed based upon the primary seed and one or more of the generations of data in the primary pool of data such that the primary seed of the primary pool is replaced with the new primary seed;
archiving the first seed and at least one of the generations of data in the first secondary pool of data; and
restoring data for one of the generations of data in the first secondary pool using the first seed, the generation of data, and generations of data in the first secondary pool that have been received prior to the generation of data being restored.

53. The method as recited in claim 52, wherein the safeset corresponding to the previous backup referenced in the obtaining step further includes one or more of the generations of data in the primary pool, and wherein the safeset corresponding to the previous backup referenced in the transferring step further includes one or more of the generations of data in the first secondary pool.

54. The method as recited in claim 52, wherein each generation of data includes one or more data blocks obtained as a result of a corresponding backup.

55. The method as recited in claim 52, wherein the first seed is the primary seed.

56. The method as recited in claim 52, wherein the first seed is generated based upon the primary seed and one or more of the generations of data in the primary pool of data such that the first seed is different from the primary seed.

57. The method as recited in claim 52, wherein the generations of data in the first secondary pool of data are obtained from the primary pool of data, wherein transferring comprises:
automatically moving a set of generations of data from the primary pool of data to the first secondary pool of data such that the primary pool of data no longer includes the set of generations of data.

58. The method as recited in claim 57, wherein moving a set of generations of data is performed automatically when a policy is met.

59. The method as recited in claim 52, wherein the first secondary pool is generated automatically when a policy is met.

60. The method as recited in claim 59, wherein the policy is met when at least one of a pre-determined date has been reached, a pre-determined time period has passed since the primary pool of data has been generated, or when a maximum number of generations of data is stored in the primary pool of data.

61. The method as recited in claim 52, further comprising:
automatically archiving the first secondary pool of data.

62. The method as recited in claim 61, wherein archiving is performed automatically when a policy is met.

63. The method as recited in claim 62, wherein the policy is met when at least one of the first secondary pool of data includes a maximum number of generations of data, when a pre-determined time period has passed since the generation of the first secondary pool of data, or when a pre-determined date has been reached.

64. A method of generating a pool of data, comprising:
automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;

automatically generating a first secondary pool of data;
automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;
wherein after the at least a portion of the data has been transferred, the primary pool of data no longer includes the first seed and the one or more generations of data;
automatically generating a new primary seed based upon the primary seed and one or more of the generations of data in the primary pool of data such that the primary seed of the primary pool is replaced with the new primary seed;
archiving the first seed and at least one of the generations of data in the first secondary pool of data;
receiving a selection of one of the generations of data in the first secondary pool to be restored; and
restoring data for the selected one of the generations of data in the first secondary pool using the first seed, the generation of data, and generations of data in the first secondary pool that have been received prior to the generation of data being restored.

65. A method of generating a pool of data, comprising:
automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;
automatically generating a first secondary pool of data;
automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;
wherein after the at least a portion of the data has been transferred, the primary pool of data no longer includes the first seed and the one or more generations of data;
automatically generating a new primary seed based upon the primary seed and one or more of the generations of data in the primary pool of data such that the primary seed of the primary pool is replaced with the new primary seed;
generating a second secondary pool of data;
automatically transferring at least a portion of the data in the primary pool of data to the second secondary pool of data such that the second secondary pool of data includes a second seed and one or more generations of data, wherein each of the generations of data in the second secondary pool of data includes one or more data blocks that have changed with reference to a safeset corresponding to a previous backup, the safeset corresponding to the previous backup including the second seed;
wherein after the at least a portion of the data is transferred to the second secondary pool of data, the primary pool of data no longer includes the at least a portion of the data;
wherein the second seed is generated based upon the primary seed and one or more generations of data including one or more data blocks that have changed with reference to a safeset corresponding to a previous backup, the safeset corresponding to the previous backup including the primary seed;
archiving the second seed and at least one of the generations of data in the second secondary pool of data; and
restoring data for one of the generations of data in the second secondary pool using the second seed, the generation of data, and generations of data in the second secondary pool that have been received prior to the generation of data being restored.

66. The method as recited in claim 65, wherein the second seed is generated automatically based upon the primary seed and one or more of the generations of data in the primary pool of data such that the second seed is different from the primary seed.

67. The method as recited in claim 65, wherein the generations of data in the second secondary pool of data are obtained from the primary pool of data, wherein transferring at least a portion of the data in the primary pool to the second secondary pool comprises:
automatically moving a set of generations of data from the primary pool of data to the second secondary pool of data such that the primary pool of data no longer includes the set of generations of data that have been moved.

68. The method as recited in claim 67, wherein moving a set of generations of data is performed automatically when a policy is met.

69. The method as recited in claim 65, wherein the second secondary pool is generated automatically when a policy is met.

70. The method as recited in claim 65, further comprising: archiving the second secondary pool of data.

71. The method as recited in claim 70, wherein archiving is performed automatically when a policy is met.

72. A method of generating a pool of data, comprising:
automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;
automatically generating a first secondary pool of data;
automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;

wherein after the at least a portion of the data has been transferred, the primary pool of data no longer includes the first seed and the one or more generations of data;

automatically generating a new primary seed based upon the primary seed and one or more of the generations of data in the primary pool of data such that the primary seed of the primary pool is replaced with the new primary seed;

generating a second secondary pool of data;

automatically transferring at least a portion of the data in the primary pool of data to the second secondary pool of data such that the second secondary pool of data includes a second seed and one or more generations of data, wherein each of the generations of data in the second secondary pool of data includes one or more data blocks that have changed with reference to a safeset corresponding to a previous backup, the safeset corresponding to the previous backup including the second seed;

wherein after the at least a portion of the data is transferred to the second secondary pool of data, the primary pool of data no longer includes the at least a portion of the data;

wherein the second seed is generated based upon the primary seed and one or more generations of data including one or more data blocks that have changed with reference to a safeset corresponding to a previous backup, the safeset corresponding to the previous backup including the primary seed;

archiving the second seed and at least one of the generations of data in the second secondary pool of data;

receiving a selection of one of the generations of data in the second secondary pool to be restored; and restoring data for the selected one of the generations of data in the second secondary pool using the second seed, the generation of data, and generations of data in the second secondary pool that have been received prior to the generation of data being restored.

73. A method of generating a pool of data, comprising:

automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;

automatically generating a first secondary pool of data;

automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;

wherein after the at least a portion of the data has been transferred, the primary pool of data no longer includes the first seed and the one or more generations of data;

automatically generating a new primary seed based upon the primary seed and one or more of the generations of data in the primary pool of data such that the primary seed of the primary pool is replaced with the new primary seed;

generating a second secondary pool of data;

automatically transferring at least a portion of the data in the first secondary pool of data to the second secondary pool of data such that the second secondary pool of data includes a second seed and one or more generations of data, wherein each of the generations of data in the second secondary pool of data includes one or more data blocks that have changed with reference to a safeset corresponding to a previous backup, the safeset corresponding to the previous backup including the second seed;

wherein after the at least a portion of the data is transferred, the first secondary pool of data no longer includes the at least a portion of the data;

wherein the second seed is generated based upon the first seed and one or more generations of data including one or more data blocks that have changed with reference to a safeset corresponding to a previous backup, the safeset corresponding to the previous backup including the first seed;

archiving the second seed and at least one of the generations of data in the second secondary pool; and restoring data for one of the generations of data in the second secondary pool based upon the second seed, the generation of data, and generations of data in the second secondary pool that have been received prior to the generation of data being restored.

74. The method as recited in claim 73, wherein the second seed is automatically generated based upon the first seed and one or more of the generations of data in the first secondary pool of data, wherein the first seed is different from the second seed.

75. The method as recited in claim 73, wherein the generations of data in the second secondary pool of data are obtained from the first secondary pool of data, wherein transferring at least a portion of the data in the first secondary pool of data to the second secondary pool of data comprises:

automatically moving a set of generations of data from the first secondary pool of data to the second secondary pool of data such that the first secondary pool of data no longer includes the set of generations of data that have been moved to the second secondary pool of data.

76. The method as recited in claim 75, wherein moving a set of generations of data is performed when a policy is met.

77. The method as recited in claim 73, wherein the second secondary pool is generated when a policy is met.

78. The method as recited in claim 73, further comprising: archiving the second secondary pool of data.

79. The method as recited in claim 78, wherein archiving is performed when a policy is met.

80. The method as recited in claim 73, further comprising: receiving a selection of the one of the generations of data in the second secondary pool to be restored.

81. An apparatus, comprising:
a processor; and a memory, at least one of the processor or the memory being adapted for:

automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed; and automatically generating a secondary pool of data;

automatically transferring at least a portion of the data in the primary pool of data to the secondary pool of data such that the primary pool of data no longer includes the at least a portion of the data that has been transferred to the secondary pool of data, wherein the secondary pool of data includes a first seed and one or more generations of data;

archiving the secondary pool of data to a storage medium; and restoring data for one of the generations of data in the secondary pool using the first seed, the generation of data, and generations of data in the secondary pool that have been received prior to the generation of data being restored.

82. An apparatus configured for generating two or more secondary pools of data based upon a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed, comprising:

a processor; and a memory, at least one of the processor or the memory being adapted for:

automatically generating a first secondary pool of data;

automatically transferring at least a portion of the data in the primary pool of data to the first secondary pool of data;

automatically generating a second secondary pool of data;

automatically transferring at least a portion of the data in the primary pool of data or at least a portion of the data in the first secondary pool of data to the second secondary pool of data such that the at least a portion of the data that has been transferred is no longer stored in the primary pool of data or the first secondary pool of data from which the at least a portion of the data has been transferred;

automatically archiving the first secondary pool of data, wherein the first secondary pool of data includes a first seed and one or more generations of data and wherein archiving the first secondary pool of data includes automatically storing the seed and at least one of the generations of data to a storage medium; and restoring data for one of the generations of data in the first secondary pool using the first seed, the generation of data, and generations of data in the first secondary pool that have been received prior to the generation of data being restored.

83. An apparatus configured for storing thereon computer-readable instructions for generating two or more secondary pools of data based upon a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed, comprising:

a processor; and a memory, at least one of the processor or the memory being adapted for:

automatically generating a first secondary pool of data;

automatically transferring at least a portion of the data in the primary pool of data to the first secondary pool of data;

automatically generating a second secondary pool of data;

automatically transferring at least a portion of the data in the primary pool of data or at least a portion of the data in the first secondary pool of data to the second secondary pool of data such that the at least a portion of the data that has been transferred is no longer stored in the primary pool of data or the first secondary pool of data from which the at least a portion of the data has been transferred, wherein transferring at least a portion of the data in the primary pool of data or at least a portion of the data in the first secondary pool of data to the second secondary pool of data is performed such that the second secondary pool of data includes a second seed and one or more generations of data, wherein each of the generations of data in the second secondary pool of data includes one or more data blocks that have changed with reference to a safeset corresponding to a previous backup, the safeset corresponding to the previous backup including the second seed;

archiving the second secondary pool of data, wherein archiving the second secondary pool of data includes automatically storing the second seed and at least one of the generations of data in the second secondary pool to a storage medium; and restoring data for one of the generations of data in the second secondary pool based upon the second seed, the generation of data, and generations of data in the second secondary pool that have been received prior to the generation of data being restored.

84. A non-transitory computer-readable medium storing thereon computer-readable instructions for generating a pool of data, comprising:

instructions for automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;

instructions for automatically generating a first secondary pool of data;

instructions for automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;

wherein after the at least a portion of the data has been transferred, the primary pool of data no longer includes the first seed and the one or more generations of data;

instructions for automatically generating a new primary seed based upon the primary seed and one or more of the generations of data in the primary pool of data such that the primary seed of the primary pool is replaced with the new primary seed;

instructions for archiving the first seed and at least one of the generations of data in the first secondary pool of data; and instructions for restoring data for one of the generations of data in the first secondary pool using the first seed, the generation of data, and generations of data in the first secondary pool that have been received prior to the generation of data being restored.

85. A non-transitory computer-readable medium storing thereon computer-readable instructions for generating a pool of data, comprising:

instructions for automatically obtaining or identifying a primary pool of data, the primary pool of data including a primary seed and one or more generations of data, wherein each of the generations of data in the primary pool of data includes one or more data blocks that have changed with reference to a safeset corresponding to a previous backup, the safeset corresponding to the previous backup including the primary seed;

instructions for automatically generating a first secondary pool of data;

instructions for automatically transferring at least a portion of the data in the primary pool of data to the first secondary pool of data such that the first secondary pool of data includes a first seed and one or more generations of data, wherein each of the generations of data in the first secondary pool of data includes one or more data blocks that have changed with reference to a safeset corresponding to a previous backup, the safeset corresponding to the previous backup including the first seed, wherein a data block has changed with reference to a safeset corresponding to a previous backup when the data block is new with reference to the safeset corresponding to the previous backup or when the data block has been modified with reference to the same data block in the safeset corresponding to the previous backup;

wherein after the at least a portion of the data has been transferred, the primary pool of data no longer includes the first seed and the one or more generations of data;

instructions for automatically generating a new primary seed based upon the primary seed and one or more of the generations of data in the primary pool of data such that the primary seed of the primary pool is replaced with the new primary seed;

instructions for archiving the first seed and at least one of the generations of data in the first secondary pool of data;

instructions for receiving a selection of one of the generations of data in the first secondary pool to be restored; and instructions for restoring data for the selected one of the generations of data in the first secondary pool using the first seed, the generation of data, and generations of data in the first secondary pool that have been received prior to the generation of data being restored.

* * * * *